US010799995B1

(12) United States Patent
Chipman (10) Patent No.: US 10,799,995 B1
(45) Date of Patent: Oct. 13, 2020

(54) PILING GUIDE TOOL

(71) Applicant: John L. Chipman, La Ward, TX (US)

(72) Inventor: John L. Chipman, La Ward, TX (US)

( * ) Notice: Subject to any disclaimer, the term of this patent is extended or adjusted under 35 U.S.C. 154(b) by 0 days.

(21) Appl. No.: 16/805,691

(22) Filed: Feb. 28, 2020

Related U.S. Application Data

(60) Provisional application No. 62/908,914, filed on Oct. 1, 2019.

(51) Int. Cl.
*B23Q 9/00* (2006.01)
*E04H 17/22* (2006.01)
*B23B 47/28* (2006.01)
*B27C 5/10* (2006.01)

(52) U.S. Cl.
CPC ............ *B23Q 9/0042* (2013.01); *B23B 47/28* (2013.01); *E04H 17/22* (2013.01); *B23B 2247/12* (2013.01); *B27C 5/10* (2013.01)

(58) Field of Classification Search
CPC . B23B 47/28; B23B 2247/06; B23B 2247/12; B23Q 9/0042–005; B27C 5/10; E02D 5/26; E04H 17/1413–1421; E04H 17/20; E04H 17/22; E04H 17/26; B25H 1/0021; B25H 1/0078
See application file for complete search history.

(56) References Cited

U.S. PATENT DOCUMENTS

| 978,740 | A | | 12/1910 | Hamilton et al. |
| 1,165,459 | A | | 12/1915 | Sprague |
| 1,583,946 | A | * | 5/1926 | Walters ............... B23B 47/28 408/87 |
| 2,838,966 | A | * | 6/1958 | Campbell ............ B23B 47/288 408/115 R |
| 4,281,694 | A | | 8/1981 | Gorman |
| 5,546,671 | A | | 8/1996 | Kehoe |
| 5,807,033 | A | * | 9/1998 | Benway ............... B23B 47/288 144/346 |
| 6,112,783 | A | * | 9/2000 | Newman ............. B23Q 9/0042 144/144.1 |
| 6,116,826 | A | * | 9/2000 | Benway .............. B23B 47/28 144/144.1 |
| 7,819,146 | B2 | | 10/2010 | McDaniel |
| 2005/0173190 | A1 | | 8/2005 | Garrett |
| 2008/0251154 | A1 | * | 10/2008 | Gill ..................... B27F 5/12 144/84 |

(Continued)

*Primary Examiner* — Matthew P Travers
(74) *Attorney, Agent, or Firm* — Suzanne Kikel, Patent Agent (57) ABSTRACT

A piling guide tool for forming a cutout for seating a brace plate on a post. The piling guide tool has a body with first and second surfaces, first and second side edges, first and second end edges, and a router guide area adjacent to an opening in the body. A pivotally mounting bolt guide mounting plate is used to cover and uncover the opening. A bolt hole guiding assembly supported on the guide mounting plate has two cylindrical hollow guides. Width adjusting assemblies are slidably mounted on the lower surface of the tool and has a movable guide rail and an adjusting screw assembly with a threaded bolt connected to the guide rail for movement thereof toward and away from the opening. Slots receive bolts to allow movement of the guide rail on the lower surface of the tool. Method for using the tool is also disclosed.

9 Claims, 5 Drawing Sheets

(56) References Cited

U.S. PATENT DOCUMENTS

| | | | |
|---|---|---|---|
| 2008/0298911 A1* | 12/2008 | Platt | B23B 47/287 |
| | | | 408/115 R |
| 2011/0305536 A1* | 12/2011 | Adkins | B23B 47/288 |
| | | | 408/1 R |
| 2012/0051866 A1* | 3/2012 | Blick | B23B 47/288 |
| | | | 408/115 B |
| 2016/0136737 A1* | 5/2016 | Setchell | B23Q 9/00 |
| | | | 144/144.52 |

* cited by examiner

PILING GUIDE TOOL

CROSS REFERENCE TO RELATED APPLICATIONS

This application claims priority to U.S. Provisional Patent Application Ser. No. 62/908,914 filed Oct. 1, 2019, the disclosure of which is incorporated herein by reference in its entirety.

BACKGROUND OF THE INVENTION

1. Field of the Invention

The present invention relates, in general, to tools, and, more particularly, to a tool cutting guide, commonly known, as a piling guide tool.

2. Brief Description of the Prior Art

Hand-held power tools, such as routers, are useful in woodworking because they are more versatile than table-mounted or fixed, stationary power tools. Hand-held power tools can be used on virtually any type of workpiece. The hand-held power tools, currently available in the marketplace, perform well on workpieces that are generally worked by table-mounted or stationary tools and, also on those workpieces that cannot be accommodated by table-mounted or stationary tools due to the size or configuration of the workpiece. The hand-held power tool is especially useful on workpieces that when worked using a table-mounted or stationary power tool require two or more operators to manipulate the workpiece. A hand-held power tool can normally make the same cuts through the efforts of only one operator.

A problem with hand-held power tools is that it is difficult to guide some tools to create cuts as precise and accurate as those which can be made with table-mounted power tools. If it were possible to precisely and accurately guide the hand-held power tool, its use would offer substantial advantages over stationary or table-mounted tools. The cost of the hand-held tool is substantially less than a stationary, table-mounted apparatus. The freedom of movement of the hand-held tool allows work to be performed by one individual on workpieces that would normally require manipulation by at least two individuals using a table-mounted power tool. Also, workpieces that cannot be mounted upon a worktable because of their configuration or size must be worked upon by using a hand-held power tool. However, in this last instance, the hand-held tool must still be carefully guided to produce cuts as precise and accurate as those made by stationary or table-mounted tools.

A router is a commonly available piece of power equipment that is used for cutting precise edges and grooves in a workpiece. In general, a router is a hand tool or power tool that a worker uses to rout or hollow out an area in relatively hard material, such as wood or plastic. Routers are mainly used in woodworking, especially cabinetry. Routers are typically handheld or fastened cutting end-up in a router table.

A problem associated with power tools becomes apparent when the workpiece is large and cumbersome, and yet, precision is required in at least some portion of the workpiece. For example, a large support post, such as, a wooden fence post, is cumbersome, yet mounting such a post in the ground may require some sort of bracing system, especially located at the foot of the post. Such bracing system must be securely attached and properly positioned on the sides of the post. Some post bracing systems have two brace plates, each mounted on opposite sides of a post. Securely mounting a brace plate to opposite sides of a post often requires cutting out an area in the outer surface on each side of the post for receiving the brace plate, and then inserting bolts through the two brace plates to secure the braces plates to the post. Cutting out and forming a seating area or cutout area in the post can be cumbersome, especially, when done at the building site or in the field. In general, the bolt accommodating holes made in the post for each brace plate must be aligned so that the bolts extend entirely through the post. Attaining such bolt alignment is often difficult, cumbersome, and time consuming, particularly, when required to be done in the field.

A pile or piling may be a vertical structural element of a deep foundation, driven or drilled deep into the ground at the building site. A piling may also be a wooden post, such as a fence post, which may be round or square, and which fence post may require two opposed brace plates on the post for a bracing system, as discussed herein above.

There is, therefore, a need in the art to provide a piling guide tool which acts as a cutting guide and which can be used in an expeditious manner on a workbench to form a cutout area on the foot of a wooden post for seating a brace plate on opposed sides of the wooden post, for easy mounting of the post in the ground at a worksite.

There is a further need in the art to provide a piling guide tool for forming a seating area or cutout area on the foot of a post for receiving a brace plate of a bracing system which may consists of at least two opposed brace plates on a square or round wooden post.

There is a further need in the art to provide a piling guide tool for forming and cleaning out, via a router, seating areas on the foot of a wooden post for receiving two brace plates and for forming and cleaning out, via a router, two spaced apart cylindrical holes in the seating areas for receiving bolts which are inserted therein for securely attaching the two brace plates together.

SUMMARY OF THE INVENTION

The present invention provides such a piling guide tool. More particularly, the present invention provides a piling guide tool for forming a cutout area for properly seating and securing a brace plate on a post. The piling guide tool comprises a body having a first surface, a second surface, a first side edge, a second side edge, a first end edge, a second end edge, a router guide area defined in the first surface, and an opening defined in the body and surrounded by the router guide area. A bolt guide mounting plate is pivotally mounted on the upper surface and adjacent to the first end edge of the body and is movable between a first position to cover the opening and a second position to uncover the opening of the body. A bolt hole guiding assembly is mounted on the bolt guide mounting plate and has two cylindrical guides.

Each cylindrical guide is hollow and has a bore extending therethrough and through the bolt guide mounting plate. Two width adjusting assemblies are movably mounted on the lower surface of the body. Each width adjusting assembly is mounted adjacent to one side edge of the body and includes a guide rail positioned on the second surface of the body to move toward and away from the opening; an adjusting screw assembly with a threaded bolt and a handle; and a bracket assembly for securing the threaded bolt on the lower surface of the body and connected to the guide rail for moving the guide rail toward and away from the opening when the handle is rotated. Slots are defined in the body and bolts extend through the slots to slidably attach the width adjusting assemblies to the body of the piling guide tool.

The piling guide tool of the invention is used to form and define a cutout area or seating area for a brace plate on the foot of a post. The piling guide tool requires the use of one or more routers and is easily positioned for use on the post. The piling guide tool of the invention further requires a drill bit to define bolt holes in the cutout area which are used to receive bolts associated with the brace plate. In general practice, two brace plates, one on opposite sides of the post are seated in the cutout areas formed on the post and are components of a bracing system well-known to those skilled in the art.

These and other features and advantages of the present invention will be better appreciated and understood when the following description is read in light of the accompanying drawings. Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 2:
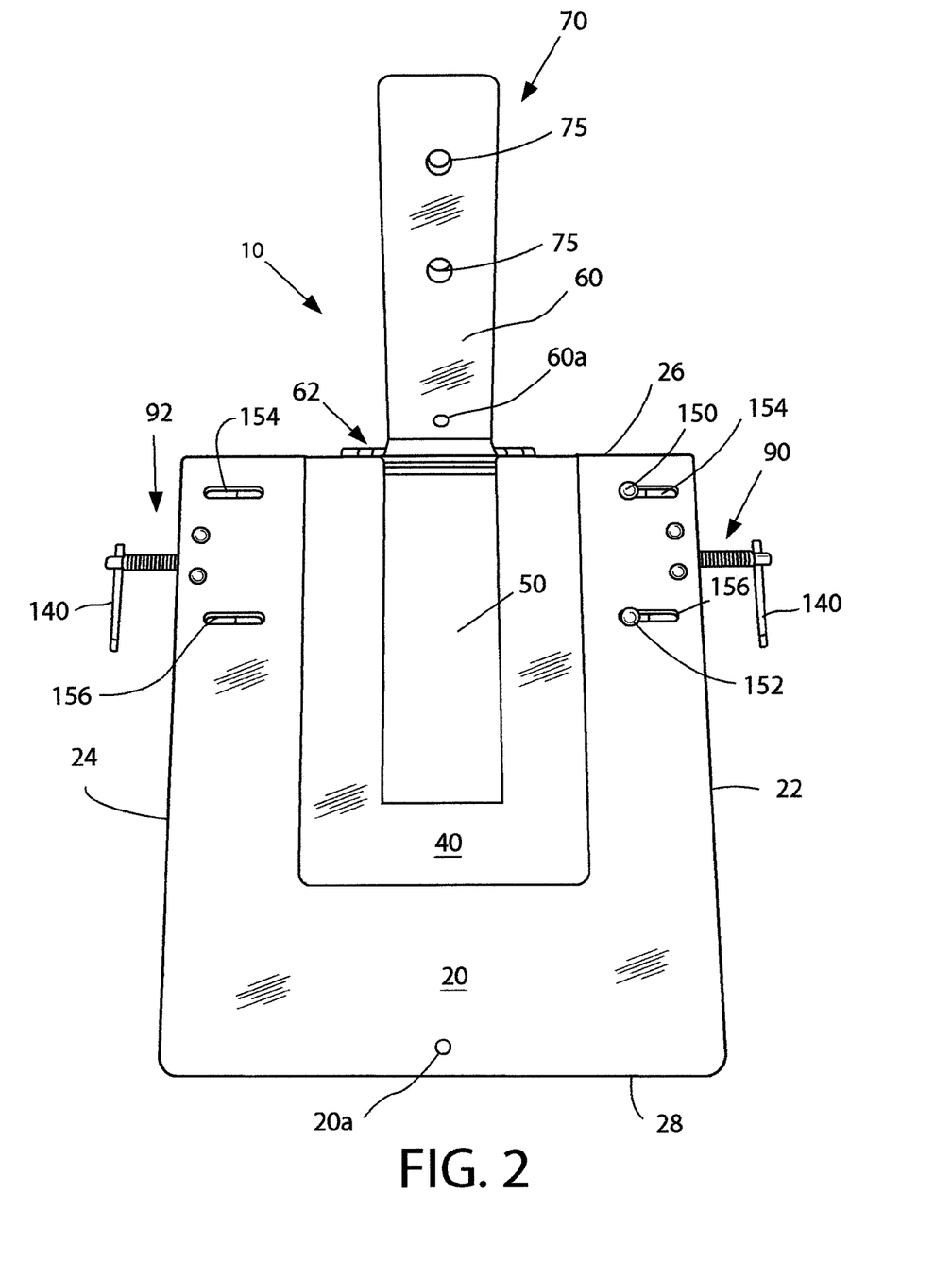
FIG. 2 is a top elevational view of the piling guide tool of FIG. 1 rotated 180 degrees and in an open configuration.
Figure 3:
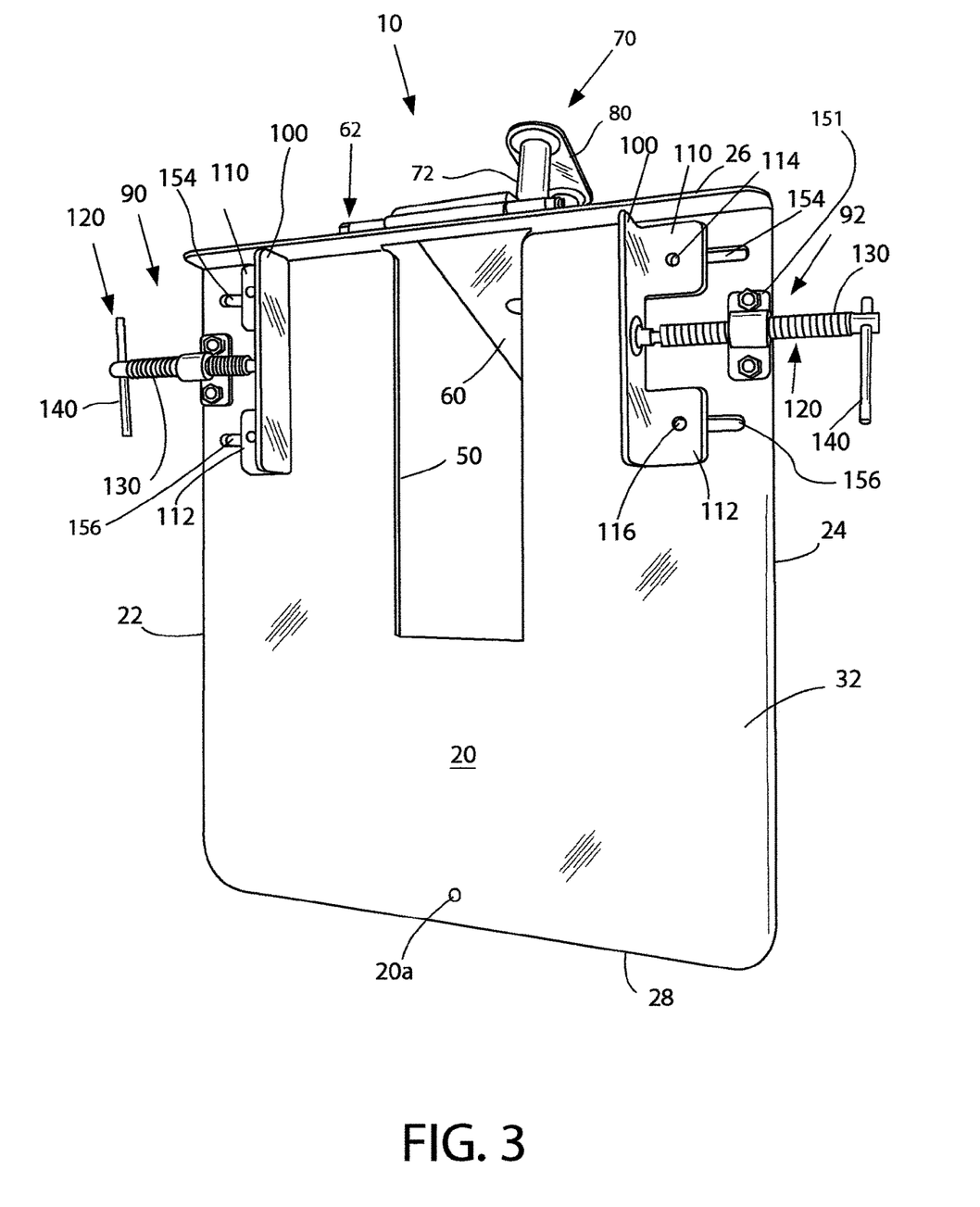
FIG. 3 is a bottom perspective view of the piling guide tool of the present invention in a closed configuration.
Figure 4:
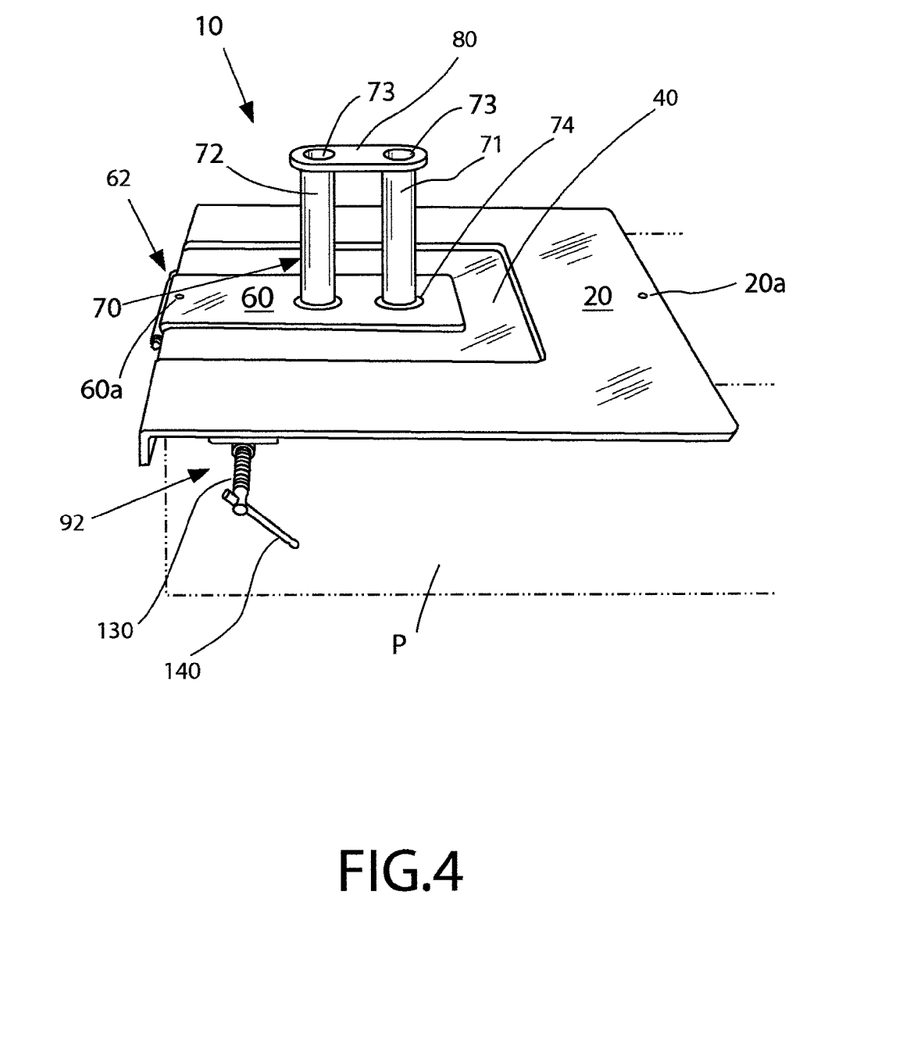
FIG. 4 is a side perspective view of the piling guide tool of FIG. 1 in operation.
Figure 5:
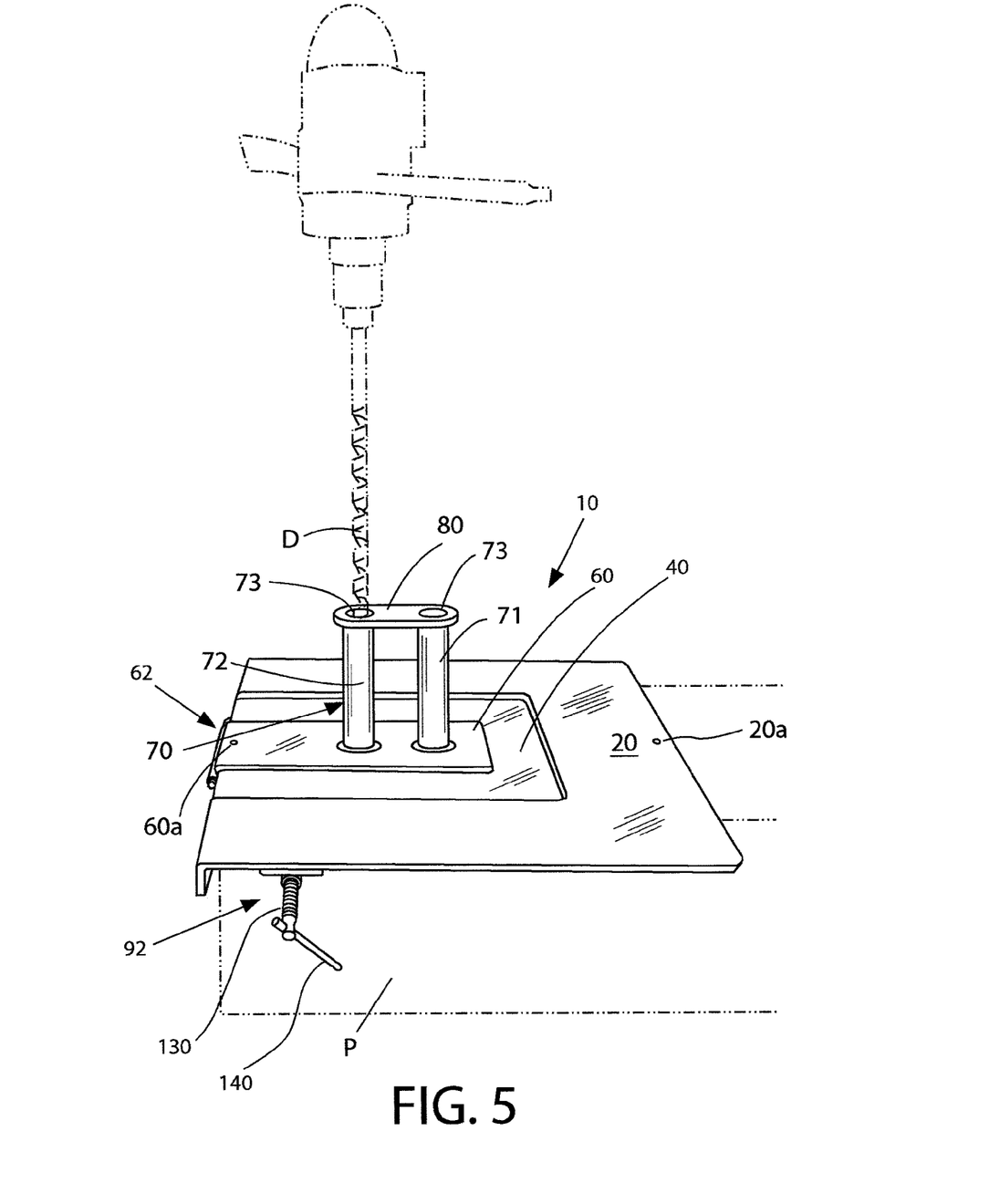
FIG. 5 is a side perspective view of the piling guide tool of FIG. 4 in combination with a drill bit.

FIGS. 1 through 5 illustrates a piling guide tool 10, which is used to define a seating area for accommodating a brace place and wherein the seating area is formed adjacent to a bottom edge of a square wooden post P such as that shown in FIGS. 4 and 5. It is to be appreciated that a brace plate (not shown) will be received in the seating area formed by using the piling guide tool 10 in a manner according to the teachings of the invention.

Figure 1:
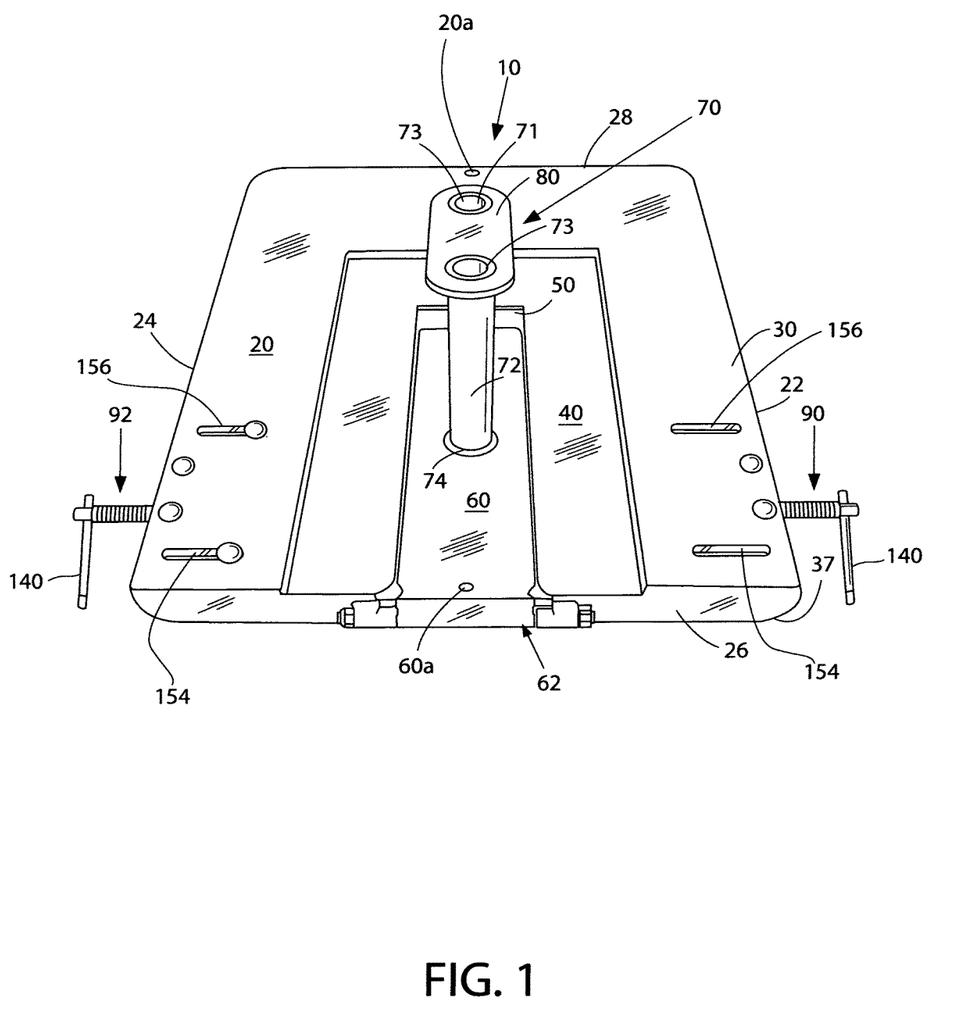
FIG. 1 is a top perspective view of a piling guide tool of the present invention in a closed configuration.

Referring to FIGS. 1, 2 and 3, piling guide tool 10 comprises a body 20 having a first side edge 22, a second side edge 24, a first end edge 26, a second end edge 28, a first surface 30 which is an upper surface when piling guide tool 10 is in use; a second surface 32 which is a lower surface with piling guide tool 10 is in use; and an aperture 20a (FIGS. 1 and 2) spaced away from and in close proximity to second end edge 28. Piling guide tool 10 further comprises a router guide area 40 defined in first surface 30 and an opening 50 defined in body 20 and within the perimeter of router guide area 40. As shown in FIG. 1, router guide area 40 is slightly recessed inwardly relative to the first or top surface 30 of body 20 and has a rectangular shape for easily receiving and retaining a suitable router (not shown). The router may be slid into and out of the router guide area 40. Suitable routers are available in the market place and are used to both form a rectangular cutout area in the outer surface of a wooden post for seating a brace plate. Opening 50 is generally rectangular in shape, and is designed to be sized and shaped to match the size and shape of the brace plate.

The brace plate may be one of two brace plates of a brace assembly used to anchor a fence post in the ground at the building site or in the field. With reference to FIGS. 4 and 5, piling guide tool 10 is mounted at the bottom of a square wooden post P to form the cutout area in the outer surface of the post for receiving and seating one brace plate. In practice, a first cutout area is formed on an outer surface of the wooden post, and the post is rotated 180 degrees so that a second cutout area is formed on the outer surface of the post opposite to that of the first cutout surface, more about which is discussed herein below.

Referring to FIGS. 1, 2, and 3, piling guide tool 10 further comprises a bolt guide mounting plate 60 which is pivotally mounted by hinge mechanism 62 on first end edge 26 of body 20 in a manner so as to be located within opening 50 of body 20. Hinge mechanism 62 allows bolt guide mounting plate 60 to be pivoted between a first position to cover opening 50 as shown in FIG. 1 and a second position to uncover opening 50 as shown in FIG. 2. As shown in FIGS. 1 and 2, bolt guide mounting plate 60 further comprises an aperture 60a located in close proximity to first end edge 26 of body 20. Both aperture 20a in body 20 and aperture 60a in bolt guide mounting plate 60 measure approximately one-eighth (⅛) inch, more about which is discussed herein below.

Referring particularly to FIG. 1, piling guide tool 10 further comprises a bolt hole guiding assembly 70 mounted on bolt guide mounting plate 60. Bolt hole guiding assembly 70 is comprised of two cylindrical guides 71, 72 which are mounted at their flanged end 74 onto bolt guide mounting plate 60. Bolt hole guiding assembly 70 further comprises a flange plate 80 which interconnects cylindrical guides 71, 72. Referring to FIGS. 1 and 2, each cylindrical guide 71, 72 is hollow and has a bore 73 extending therethrough and communicating with a bore 75 in bolt guide mounting plate 60 (FIG. 2) and communicating with a bore (not shown) in flange plate 80. Referring particularly to FIG. 5, bores 73 of cylindrical guides 71,72 and the bore in flange plate 80 are sized to accommodate a drill bit D which is used to form bolt accommodating holes in the wooden post P, more about which will be discussed herein below.

Referring particularly to FIG. 3, piling guide tool 10 further comprises two width adjusting assemblies 90, 92 which are mounted on second surface 32 of body 20 adjacent to side edges 22 and 24, respectively, of piling guide tool 10. Each width adjusting assembly 90, 92 has a movable guide rail 100 which is movable on second surface 32 of body 20 via mounts 110, 112; bolts 114,116; and adjusting screw assembly 120.

Adjusting screw assembly 120 is mounted on body 20 adjacent to side edges 22, 24. Adjusting screw assembly 120 has a threaded bolt 130. Threaded bolt 130 is mounted at its one end to movable guide rail 10 and secured to second surface 32 of body 20 via bracket assembly 151, which, in turn, is mounted on second surface 32 of body 20. Each adjusting screw assembly 120 is constructed to move toward and away from each other and its respective side edge 22, 24 of body 20 of piling guide tool 10.

Movement of guide rails 100 along second surface 32 of body 20 and toward and away from each other is controlled by turning handles 140, which rotate its respective threaded bolt 130. It is to be appreciated that movement of guide rails 100 toward and away from each other changes the dimension of the distance between guide rails 100 such that piling guide tool 10 can be securely clamped onto the sides of a square wooden piling post P, as illustrated in FIGS. 4 and 5. Post P may be used as a fence post, where, in general, it is to be driven into the ground through suitable means at the building site or in the field.

With reference to FIGS. 2 and 3, bolt 114 extends though mount 110 and into slot 154, and bolt 116 extends through mount 112 and into slot 156 so that guide rail 100 of each width adjusting assembly 90, 92 can be moved into a desired position prior to piling guide tool 10 being secured in place onto post P.

A method for using piling tool guide 10 on a square wooden piling post P is illustrated in FIGS. 4 and 5. Piling guide tool 10 is mounted along the two sides of post P adjacent to an end of the post, and is secured in position on the post by adjusting the distance between width adjusting assemblies 90, 92. This distance will be slightly greater than the width of the post P. Bolts 114 and 116 are tightened to secure width adjusting assembly 90, 92 in place. Bolts 114, 116 are received in slots 154, 156 such that each width adjusting assembly 90, 92 can be moved into a desired position on body 20 prior to piling guide tool 10 being secured in place on the post. It is to be appreciated that the distance between the two width adjusting assemblies 90, 92 will be approximately the same dimension as the width of the post so that piling guide tool 10 can be securely attached to the sides of the post P.

As particularly shown in FIG. 2, bolt guide mounting plate 60 is pivoted upwardly to uncover opening 50. A router (not shown) is positioned onto router guide area 40 and in close proximity to opening 50, and the router is used to route and clean a cutout area on the outer surface of the post. This cutout area is sized and shaped to create a seating area for the brace plate (not shown). Once the cutout area is formed in post P, bolt guide mounting plate 60 is pivoted via hinge mechanism 62 into position to cover opening 50 and to position bolt hole guiding assembly 70 with cylindrical guides 71, 72 over opening 50 as shown in FIGS. 1, 4 and 5.

As shown particularly in FIG. 5, a drill bit D is inserted into bore 73 of each cylindrical guide 71, 72 to form bolt accommodating holes in post P. When bolt accommodating holes are formed, drill bit D is removed and the bolt-hole guiding assembly 70 is once again pivoted upwardly to uncover opening 50. The router is placed on bolt guide mounting plate 60 and is used to route and clean the two spaced-apart bolt receiving holes. Piling guide tool 10 is removed from the post. The result is that an adequate seating area for receiving a brace plate is defined along the sides of the post and bolt accommodating holes are formed in the post for bolting the brace plates to the post P.

A further, more detailed method for using piling tool guide 10 on post P is disclosed with reference to FIGS. 4 and 5. The steps include:

1) marking the center of the post P along its vertical axis and drawing a vertical line about 16 inches up from the bottom of post P;

2) placing the piling tool guide 10 onto post P such that piling tool guide 10 abuts the bottom of post P;

3) aligning aperture 20a of body 20 and aperture 60a of bolt guide mounting plate 60 over the drawn vertical line;

4) driving a nail into each aperture 20a and 60a;

5) rotating handle 140 of the two width adjusting assemblies 90, 92, with one width adjusting assembly being turned to the left and the other width adjusting assembly being turned to the right to adjust the distance therebetween to be slightly greater than the width of post P so that piling tool guide 10 can be securely attached to the sides of post P and at the bottom thereof upon the operation of the adjusting screw assemblies 120 as shown in FIGS. 4 and 5;

6) removing the nails from apertures 20a and 60a;

7) pivoting or flipping over bolt guide mounting plate 60 so that it covers opening 50 of piling tool guide 10 and drilling two holes, each measuring about three-fourth (¾) inches by placing drill bit D into the bores 73 of cylindrical guides 71, 72, and then pivoting bolt-guide mounting 60 to uncover opening 50;

8) sliding a suitable router with a three-fourth (¾) inch bit into router guide 40 and routing out the center area defined by opening 50 by working the router back and forth until this center area is clean followed by routing out the two holes formed by drill bit D in bores 73 of cylindrical guides 71, 72;

9) removing piling guide tool 10 and rotating the post P 180 degrees to expose an opposed side of the post;

10) repeating steps 1 through 7; and 11) seating a brace plate in the routed out center area formed on each opposed side of the post and inserting bolts through the routed out holes in the post P and the holes which correspond in the brace plate which correspond to those holes in the post P to securely attach the two brace plates together on opposed sides of the post.

As is apparent, the above steps will result in a cutout area being formed on opposite sides of the post for receiving and adequately seating a brace plate of a bracing system with two through holes for receiving bolts for attaching the two brace plates together on opposite sides of the post. Also, it is to be appreciated that the routed out or cutout areas formed on opposite sides of the post P by a router and the routed out holes in the post P can easily be done on a workbench located inside a sheltered building prior to the post being shipped to the worksite or to the field. It is also to be appreciated that optionally the brace plates can be assembled on the post P prior to the post being shipped to the worksite or to the field.

While various embodiments of the invention have been described in connection with the preferred embodiments of the figures, it will be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:

1. A piling guide tool for forming a cutout area for a brace plate on a post, comprising:

a body having a first surface, a second surface, a first side edge, a second side edge, a first end edge, a second end edge, a router guide area defined in the first surface, and an opening defined in the body and surrounded by the router guide area;

a bolt guide mounting plate pivotally mounted on the first surface of the body adjacent to the first end edge of the body and movable between a first position covering the opening defined in the body and a second position uncovering the opening defined in the body;

a bolt hole guiding assembly mounted on the bolt guide mounting plate, and having at least two cylindrical guides, each cylindrical guide being hollow and having a bore extending therethrough and through the bolt guide mounting plate; and at least two width adjusting assemblies movably mounted on the second surface of the body, each width adjusting assembly being mounted adjacent to one of the first and second side edges of the body and including: a guide rail positioned on the second surface of the body to move toward and away from the opening defined in the body; an adjusting screw assembly having a threaded bolt and a handle connected to the threaded bolt; and a bracket assembly for securing the threaded bolt on the second surface of the body and connected to the guide rail to move the guide rail toward and away from the opening defined in the body when the handle is rotated; and each width adjusting assembly further including slots defined in the body and bolts extending through the slots and slidably attaching the guide rail to the body.

2. The piling guide tool of claim 1, wherein the body further includes an aperture adjacent to the second end edge; wherein the bolt guide mounting plate includes an aperture adjacent to the first end edge of the body; and wherein the router guide area of the body is recessed relative to the first surface of the body for receiving a router.

3. The piling guide tool of claim 1, wherein the bolt guide mounting plate further includes a hinge mechanism for pivotal movement between the first position covering the opening and the second position uncovering the opening defined in the body of the piling guide tool.

4. A piling guide tool for defining a brace plate accommodating area on a post, comprising:

a body having a first side edge, a second side edge, a first end edge, a second end edge, a router guide area defined in a first surface, and an opening defined through the body and surrounded by the router guide area;

a bolt guide mounting plate pivotally mounted on the body adjacent to the first end edge of the body, the bolt guide mounting plate movable between a first position covering the opening defined in the body and a second position uncovering the opening defined in the body;

a bolt hole guiding assembly mounted on the bolt guide mounting plate, and having at least two cylindrical guides, each cylindrical guide being mounted at one end on the bolt guide mounting plate and having a second end spaced from the bolt guide mounting plate, each cylindrical guide being hollow and having a bore extending therethrough and through the bolt guide mounting plate, and a flange mounted on the second end of the cylindrical guide; and at least two width adjusting assemblies mounted on a second surface, a first of said width adjusting assemblies being positioned adjacent to the first side edge and a second of said width adjusting assemblies being positioned adjacent to the second side edge of the body.

5. The piling guide tool of claim 4, wherein the body further includes an aperture adjacent to the second end edge; wherein the bolt guide mounting plate includes an aperture adjacent to the first end edge of the body; and wherein the router guide area of the body is recessed relative to the first surface of the body for receiving a router.

6. The piling guide tool of claim 4, wherein the bolt guide mounting plate further includes a hinge mechanism for pivotal movement between the first position covering the opening and the second position uncovering the opening defined in the body of the piling guide tool.

7. A method for forming a cut out area for seating a brace plate for a post by using the piling guide tool of claim 1, the steps comprising:

(a) marking a center of the post along a vertical axis and drawing a vertical line 16 inches up from a bottom of the post;

(b) placing the piling guide tool onto the post such that the piling guide tool abuts the bottom of the post;

(c) aligning an aperture of the body of the piling guide tool and an aperture of the bolt guide mounting plate over the drawn vertical line on the post;

(d) driving a first nail into the aperture of the body and a second nail into the aperture of the bolt guide mounting plate adjacent to one end of the post;

(e) securing the piling guide tool to the post using the two width adjusting assemblies;

(f) removing the first nail from the aperture on the body of the piling guide tool and removing the second nail from the aperture on the bolt guide mounting plate;

(g) pivoting the bolt guide mounting plate to cover the opening defined in the body of the piling guide tool and drilling two holes in the post by placing a drill bit into the two cylindrical guides;

(h) pivoting the bolt guide mounting plate to uncover the opening defined in the body of the piling guide tool;

(i) placing a router with a bit on the router guide area and routing out a center area to form a first cutout area in the post by moving the router back and forth and routing out the two holes in the post formed by the drill bit; and (j) removing the piling guide tool from the post.

8. The method of claim 7, the steps further including:

rotating the post 180 degrees and repeating steps (a) through (j) to form a second cutout area in the post on an opposed side of the post.

9. The method of claim 8, the steps further including:

seating a first brace plate and a second brace plate in the first and second cutout areas, respectively, and securing the first brace plate and the second brace plate together by inserting a bolt into each of the two holes in the post and through corresponding holes in the first brace plate and in the second brace plate.

* * * * *